(12) United States Patent
Niu et al.

(10) Patent No.: US 9,602,980 B2
(45) Date of Patent: *Mar. 21, 2017

(54) TECHNIQUES FOR HIERARCHICAL ENCODING FOR MULTICAST BROADCAST SERVICES IN WIRELESS COMMUNICATION SYSTEMS

(71) Applicant: Intel Corporation, Santa Clara, CA (US)

(72) Inventors: Huaning Niu, Milpitas, CA (US); Yujian Zhang, Beijing (CN); Changlong Xu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/581,884

(22) Filed: Dec. 23, 2014

(65) Prior Publication Data

US 2015/0117296 A1    Apr. 30, 2015

Related U.S. Application Data

(63) Continuation of application No. 12/456,568, filed on Jun. 17, 2009, now Pat. No. 8,929,268.

(60) Provisional application No. 61/094,357, filed on Sep. 4, 2008.

(51) Int. Cl.
*H04W 4/06* (2009.01)
*H04L 27/34* (2006.01)
*H04L 12/18* (2006.01)

(52) U.S. Cl.
CPC ........... *H04W 4/06* (2013.01); *H04L 27/3488* (2013.01); *H04L 12/189* (2013.01)

(58) Field of Classification Search
None
See application file for complete search history.

(56) References Cited

U.S. PATENT DOCUMENTS

| | | | |
|---|---|---|---|
| 8,929,268 B2 | 1/2015 | Niu et al. | |
| 2006/0195752 A1 | 8/2006 | Walker et al. | |
| 2006/0203713 A1* | 9/2006 | Laroia | H04L 5/023 370/209 |
| 2007/0195907 A1 | 8/2007 | Wang et al. | |
| 2007/0250638 A1* | 10/2007 | Kiran | H04L 1/0006 709/236 |

(Continued)

FOREIGN PATENT DOCUMENTS

| | | |
|---|---|---|
| CN | 1141712 A | 1/1997 |
| CN | 1666442 A | 9/2005 |

(Continued)

OTHER PUBLICATIONS

Chart et al.; FLO Physical Layer: An Overview; IEEE Transactions on Broadcasting; Mar. 2007; pp. 145-160; vol. 53, No. 1; IEEE.

(Continued)

*Primary Examiner* — Brandon Renner
(74) *Attorney, Agent, or Firm* — Thorpe North & Western

(57) ABSTRACT

An embodiment of the present invention provides an apparatus, comprising a transceiver adapted for hierarchical encoding for a Multicast Broadcast Service (MBS) in wireless networks, wherein the hierarchical encoding is provided by superposition coding to provide different levels of protection for data streams.

20 Claims, 5 Drawing Sheets

(56) References Cited

U.S. PATENT DOCUMENTS

| | | | |
|---|---|---|---|
| 2008/0032744 A1* | 2/2008 | Khan | H04B 7/0615 455/562.1 |
| 2009/0028105 A1* | 1/2009 | Schaepperle | H04W 72/04 370/329 |
| 2010/0322129 A1 | 12/2010 | Niu et al. | |

FOREIGN PATENT DOCUMENTS

| | | |
|---|---|---|
| CN | 1751503 A | 3/2006 |
| CN | 101052139 A | 10/2007 |
| CN | 101355477 A | 1/2009 |
| CN | 102461166 A | 5/2012 |
| EP | 2443832 A2 | 3/2012 |
| JP | H08-506473 A | 7/1996 |
| JP | 2006/261982 A | 9/2006 |
| JP | 2007/6333 A | 1/2007 |
| JP | 2008/533820 A | 8/2008 |
| KR | 10-2008-0109812 A | 12/2008 |
| TW | 201119394 A | 6/2011 |
| WO | WO 95/16314 A2 | 6/1995 |
| WO | WO 95/24102 A2 | 9/1995 |
| WO | WO 2004/080067 A1 | 9/2004 |
| WO | WO 2006/096680 A1 | 9/2006 |
| WO | WO 2006/101168 A1 | 9/2006 |
| WO | WO 2009/039638 A1 | 4/2009 |
| WO | WO 2010/147755 A2 | 12/2010 |
| WO | WO 2010/147755 A3 | 2/2013 |

OTHER PUBLICATIONS

ETSI; Digital Video Broadcasting (DVB); Framing structure, channel coding and modulation for digital terrestrial television; ETSI EN 300 744 v 1.5.1; Jun. 2004; 64 pages; European Broadcasting Union.

Josiam et al.; Improvements in System Performance due to simultaneous transmission of E-MBS and Unicast; IEEE C802.16m-08/361; May 5, 2008; 21 pages; IEEE 802.16 Broadband Wireless Working Group.

Tahir; Unequal error protection for wireless data transmission using superposition coding with feedback; International Conference on Innovations in Information Technology, 2008); Dec. 16-18, 2008; pp. 426-429 ; IEEE.

Wang et al.; System Architecture and Cross-Layer Optimization of Video Broadcast over WiMAX; IEEE Journal on Selected Areas in Communication; May 2007; pp. 712-721; vol. 25, No. 4; IEEE.

PCT application PCT/US2010/036823; filing date Jun. 1, 2010; Intel Corporation; International Search Report mailed Dec. 15, 2010.

PCT application PCT/US2010/036823; filing date Jun. 1, 2010; Intel Corporation; International Preliminary Report on Patentability mailed Jan. 5, 2012.

Chinese patent application 201080027690.X; filing date Jun. 1, 2010; Intel Corporation; office action mailed Nov. 8, 2013.

Chinese patent application 201080027690.X; filing date Jun. 1, 2010; Intel Corporation; office action mailed Jul. 29, 2014.

Chinese patent application 201080027690.X; filing date Jun. 1, 2010; Intel Corporation; office action mailed Feb. 9, 2015.

Japan patent application 2012-516106; filing date Jun. 1, 2010; Intel Corporation; office action mailed Mar. 26, 2013.

Japan patent application 2012-516106; filing date Jun. 1, 2010; Intel Corporation; office action mailed Jan. 7, 2014.

Japan patent application 2012-516106; filing date Jun. 1, 2010; Intel Corporation; office action dated Jun. 10, 2014.

Korea patent application 10-2011-7030163; filing date Jun. 1, 2010; Intel Corporation; office action Dec. 11, 2012.

Taiwan patent application 099117013; filing date May 27, 2010; Intel Corporation; office action mailed Apr. 29, 2013.

Taiwan patent application 099117013; filing date May 27, 2010; Intel Corporation; office action mailed Nov. 11, 2013.

\* cited by examiner

US 9,602,980 B2

TECHNIQUES FOR HIERARCHICAL ENCODING FOR MULTICAST BROADCAST SERVICES IN WIRELESS COMMUNICATION SYSTEMS

CROSS-REFERENCE TO RELATED APPLICATION

This application is a continuation of U.S. patent application Ser. No. 12/456,568 filed Jun. 17, 2009, which claims the benefit under 35 U.S.C. §119(e) of a U.S. Provisional application filed on Sep. 4, 2008 in the U.S. Patent and Trademark Office and assigned Ser. No. 61/094,357, both of which are hereby incorporated by reference in their entirety.

BACKGROUND

Hierarchical encoding is widely supported in current broadcast standards. In broadcast systems, the capacity is typically limited by the worst user in the coverage area. By using hierarchical encoding, users with a limited signal to noise ratio (SNR) may only receive low quality video. Users with high SNR may take advantage of hierarchical encoding to receive high quality. Therefore, overall MBS capacity is improved.

Current techniques supporting hierarchical encoding by layered modulation is limited in single input single output (SISO) transmissions. For example, the 16QAM constellation used in DVB-T has 3 formats, one non-layered constellation, and two layered constellations for hierarchical encoding as shown in FIG. 1 at 100 and FIG. 2 at 200. FIG. 1 depicts a first 110 layered 16QAM modulation format in DVB-T and FIG. 2 depicts a second 210 layered 16QAM modulation format in DVB-T; A similar layered constellation is also defined in the MediaFLO standard, where only the scale of the constellation is changed slightly. The layered constellation provides an essential improvement for broadcast services. The limitations are (1) only two level of adaptation is available as defined in both DVB-T and MediaFLO; and (2) it can only be used in single transmit antenna case.

Thus, a strong need exists for improved techniques for hierarchical encoding for multicast broadcast services in wireless communication systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
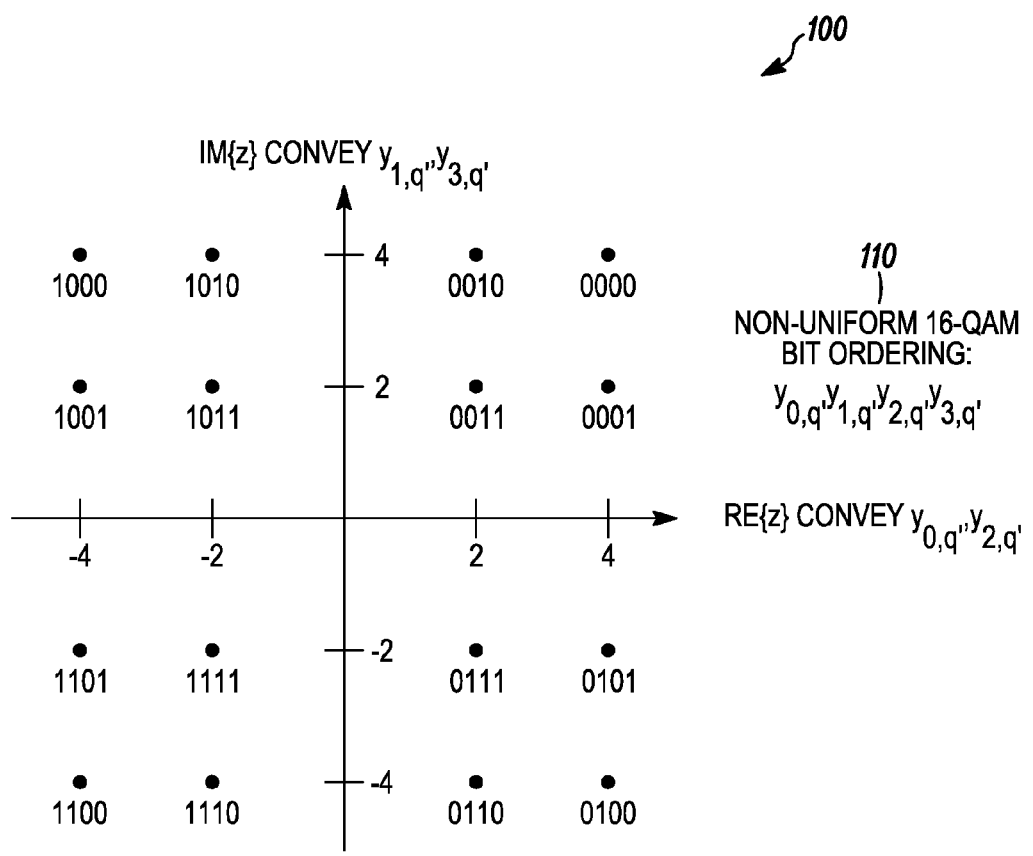
FIG. 1 depicts a layered 16QAM modulation format 1 in DVB-T.
Figure 2:
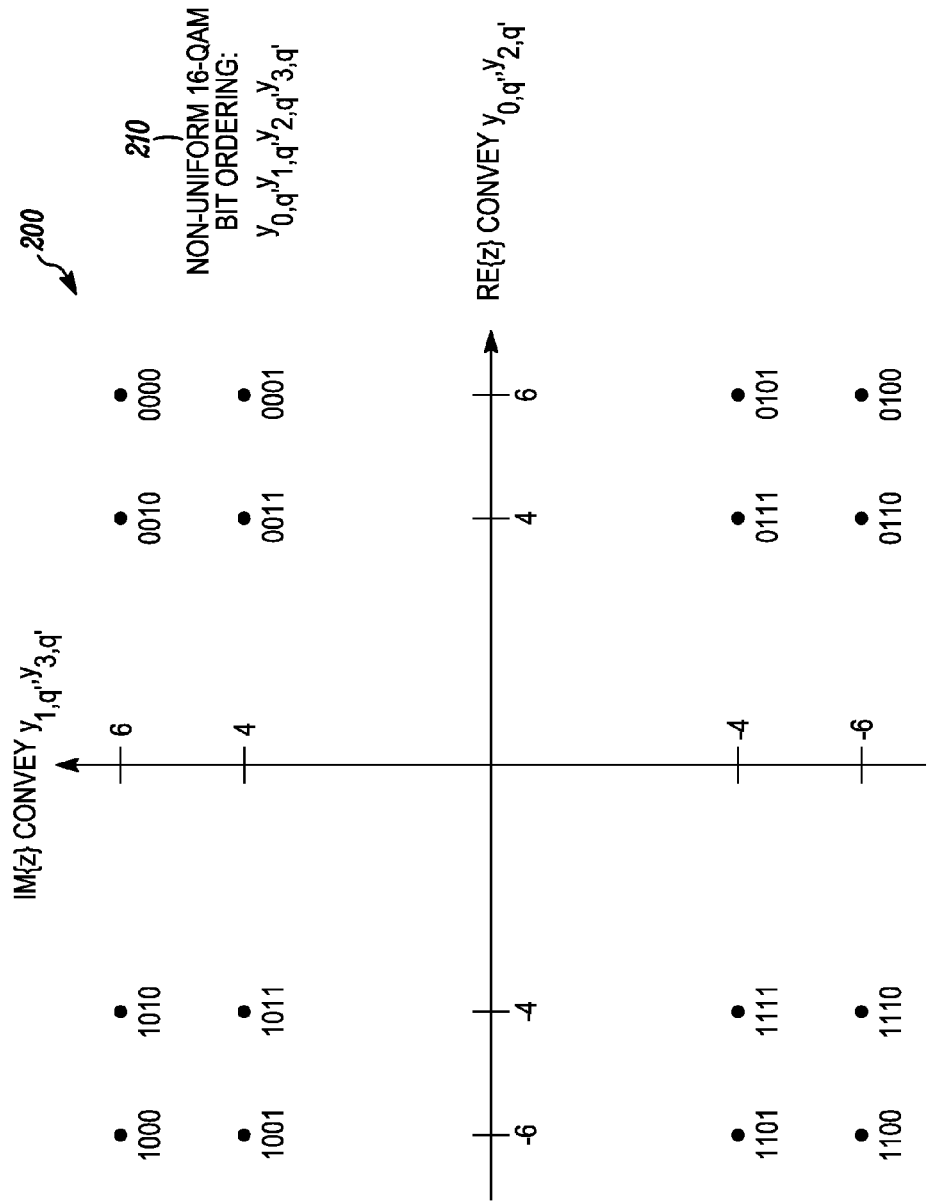
FIG. 2 depicts a layered 16QAM modulation format in DVB-T.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Layered modulation is a special case of superposition coding in general. Superposition coding is proved to achieve broadcast capacity comparing to TDM and FDM and is a scheme for multiplexing a broadcast service and a unicast service. However there are several limitations on MBS/Unicast superposition coding, such as: (1) higher cost for devices with unicast service only; (2) large buffer and long delay for unicast service as MBS transmission period is typically longer; and (3) large pilot overhead overall as MBS and unicast service require different pilots etc.

Embodiments of the present invention provide using superposition coding to provide different levels of protection for data streams, such as MPEG streams. Although the present invention is not limited in this respect.

Embodiments of the present invention provide a scheme based on superposition coding to support hierarchical encoding in wireless networks, such as a network that operates in compliance with the Institute for Electronics and Electrical Engineers (IEEE) 802.16m MBS network. The present invention may use the large variance of the signal to interference noise ratio (SINR) distribution within the network. Embodiments of the present invention may transmit the high priority bits with greater power, and the low priority bits with less power from a base station (BS). For users that are far away from a base station with limited SINR, it will decode the high priority stream only. The low priority bits are considered as noise, which is much lower than the noise floor and therefore does not degrade the performance. For good users with high SINR, it can decode the high priority stream first, in which case the main noise source is the low priority stream. The high priority stream is then cancelled from the transmission, and the low priority stream is decoded with high reliability due to the high SINR level.

Figure 3:
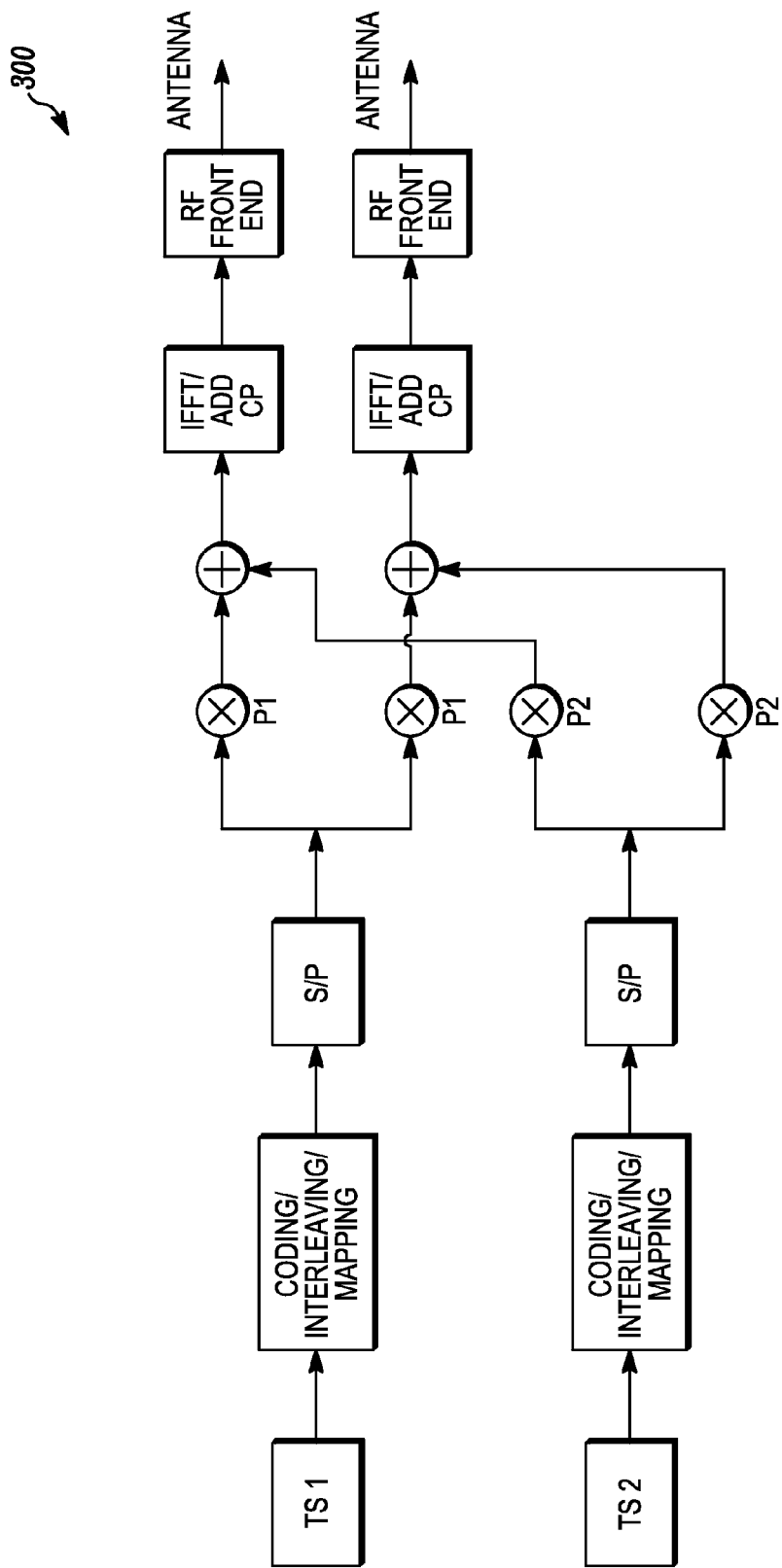
FIG. 3 depicts a transmit diagram with hierarchical encoding according to an embodiment of the present invention.
Figure 4:
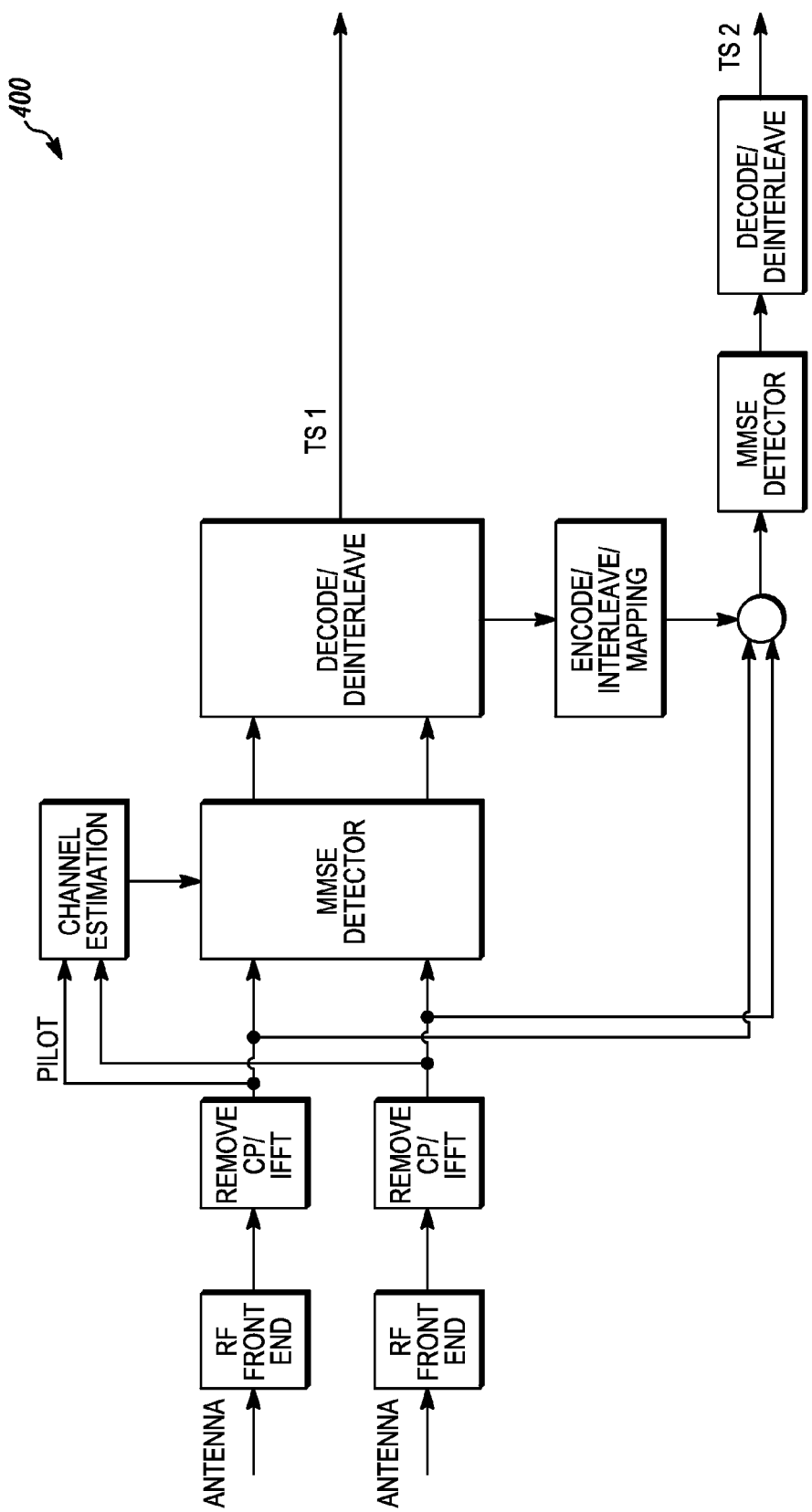
FIG. 4 depicts a receive diagram with interference cancellation for good SNR users according to an embodiment of the present invention.
Figure 5:
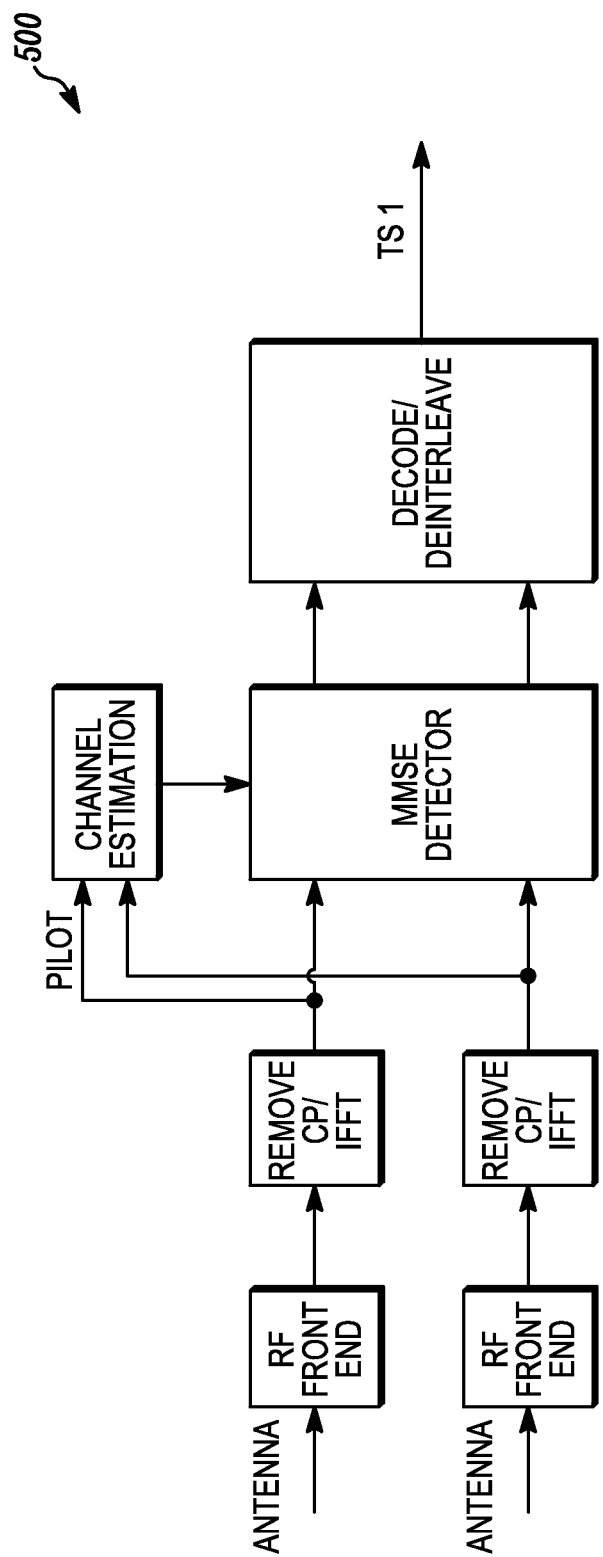
FIG. 5 illustrates a receive diagram for bad SNR users according to an embodiment of the present invention.

Looking now at FIG. 3, shown generally as 300, is a block diagram for the transmit side. The receive (Rx) diagram for good users with high SINR is shown in FIG. 4 at 400. With interference cancellation, the good users can receive both the important stream and the less important stream to achieve high video quality. A typical receive diagram for bad users with low SINR is shown in FIG. 5 at 500. Only the high priority stream is received and therefore a lower quality video.

Embodiments of the present invention have several main advantages over the layered modulation method: (1) It does not limit to just two levels of hierarchical protection. By adjusting the power level of the high priority stream and low priority stream, multiple levels of hierarchical protection are achieved. (2) It can be used with MIMO transmissions, which is a key requirement in the IEEE 802.16m deployment. (3) The high priority stream and low priority stream length can be very flexible based on application and source codec, as the coding/modulation for each priority stream is specified separately.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A system operable to perform hierarchical encoding for unicast services, the system comprising:
a transceiver configured to perform superposition coding for a unicast service in wireless networks, wherein the superposition coding is provided by transmitting high priority bits with a power level to form a high priority stream, and low priority bits with a lower power level than the high priority bits to form a low priority stream that provides different levels of protection for data streams, wherein the low priority stream is not decoded when a signal to interference noise ratio (SINR) is less than a selected level and the low priority stream is configured to be used with the high priority stream when the SINR is greater than the selected level.

2. The system of claim 1, wherein the transceiver is operated as a base station that is operable for communication with mobile stations (MSs) and wherein MSs that are a selected distance from the base station with a signal to interference noise ratio (SINR) that is less than a selected level will decode the high priority stream only and the low priority stream is considered noise.

3. The system of claim 2, wherein for MSs with a high SINR that is greater than the selected level, the base station decodes the high priority streams first, in which case a main noise source is the low priority stream, and the high priority stream is then cancelled from transmission, and the low priority stream is decoded with high reliability due to the high SINR that is greater than the selected level.

4. The system of claim 1, wherein the data streams are Moving Picture Experts Group (MPEG) data streams.

5. The system of claim 1, wherein the wireless networks operate in compliance with Institute for Electronics and Electrical Engineers (IEEE) 802.16m wireless networks.

6. The system of claim 1, wherein the power level is adjusted in order to support multiple levels of hierarchical protection for the unicast services.

7. The system of claim 1, wherein the transceiver is further configured to perform the superposition coding for multiple-input and multiple-output (MIMO) transmissions.

8. The system of claim 1, wherein a length associated with the data streams is based on an application and source codec.

9. A method for performing hierarchical encoding for unicast services, the method comprising:
using superposition coding by a transceiver configured to perform a unicast service in wireless networks, wherein the superposition coding provides different levels of protection for data streams by transmitting high priority bits in the data stream with a power level to form a high priority stream, and low priority bits in the data stream with a lower power level than the high priority bits to form a low priority stream, wherein the low priority stream is configured to not be decoded when a signal to interference noise ratio (SINR) is less than a selected level and the low priority stream is configured to be used with the high priority stream when the SINR is greater than the selected level.

10. The method of claim 9, further comprising operating the transceiver as a base station for communication with mobile stations (MSs) and wherein MSs that that are a selected distance from the base station with a signal to interference noise ratio (SINR) less than a selected level will decode a high priority stream only and a low priority stream is considered noise.

11. The method of claim 10, wherein for MSs with a high SINR that is greater than the selected level, the base station decodes high priority streams first, in which case a main noise source is the low priority stream, and the high priority stream is then cancelled from transmission, and the low priority stream is decoded with high reliability due to a high SINR level.

12. The method of claim 9, wherein the data streams are Moving Picture Experts Group (MPEG) data streams.

13. The method of claim 9, wherein the wireless networks operate in compliance with Institute for Electronics and Electrical Engineers (IEEE) 802.16m wireless networks.

14. The method of claim 9, further comprising adjusting the power level in order to support multiple levels of hierarchical protection for the unicast services.

15. The method of claim 9, further comprising performing, at the transceiver, the superposition coding for multiple-input and multiple-output (MIMO) transmissions.

16. The method of claim 9, wherein a length associated with the data streams is based on an application and source codec.

17. A non-transitory computer readable medium encoded with computer executable instructions, which when accessed, cause a machine to perform operations comprising:
controlling encoding by a transceiver configured to perform a unicast service in wireless networks, wherein the hierarchical encoding is provided by superposition coding to provide different levels of protection for a data stream by transmitting high priority bits in the data stream with a power level to form a high priority stream, and low priority bits in the data stream with a lower power level than the high priority bits to form a low priority stream, wherein the low priority stream is configured to not be decoded when a signal to interference noise ratio (SINR) is less than a selected level and the low priority stream is configured to be used with the high priority stream when the SINR is greater than the selected level.

18. The computer readable medium encoded with computer executable instructions of claim 17, further comprising additional instruction that provide operating the transceiver as a base station in the wireless network and transmitting high priority bits at a power level, and low priority bits with a lower power level than the high priority bits.

19. The computer readable medium encoded with computer executable instructions of claim 18, further comprising additional instruction that provide operating the base station for communication with mobile stations (MSs) and wherein MSs that are a selected distance from the base station with limited a signal to interference noise ratio (SINR) less than a selected level will decode a high priority stream only and a low priority stream is considered noise.

20. The computer readable medium encoded with computer executable instructions of claim 17, wherein for MSs with a high SINR that is greater than the selected level, the base station decodes high priority streams first, in which case a main noise source is the low priority stream, and the high priority stream is then cancelled from transmission, and the low priority stream is decoded with high reliability due to a high SINR level.

* * * * *